J. G. MAYER.
HAY CARRIAGE.
APPLICATION FILED SEPT. 5, 1919.
1,342,341.
Patented June 1, 1920.
3 SHEETS—SHEET 2.
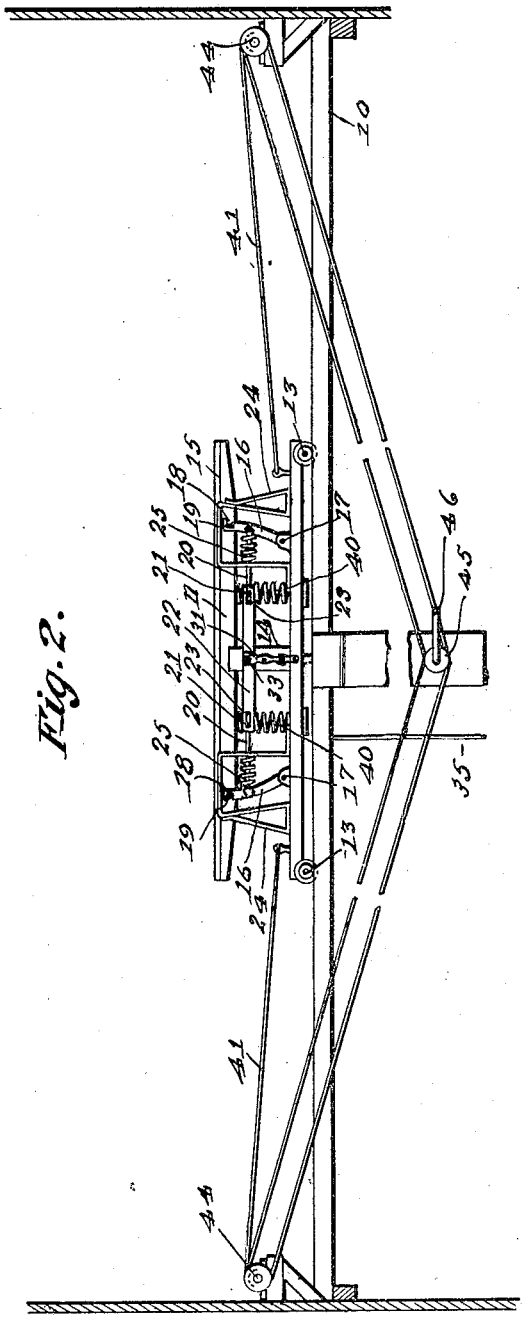
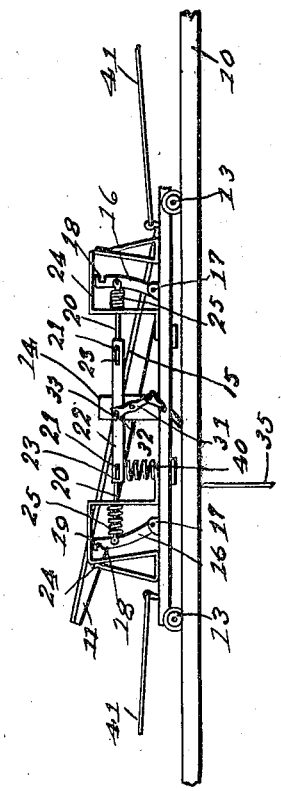
WITNESS:
R. A. Thomas
INVENTOR.
BY John G. Mayer
Victor J. Evans
ATTORNEY.

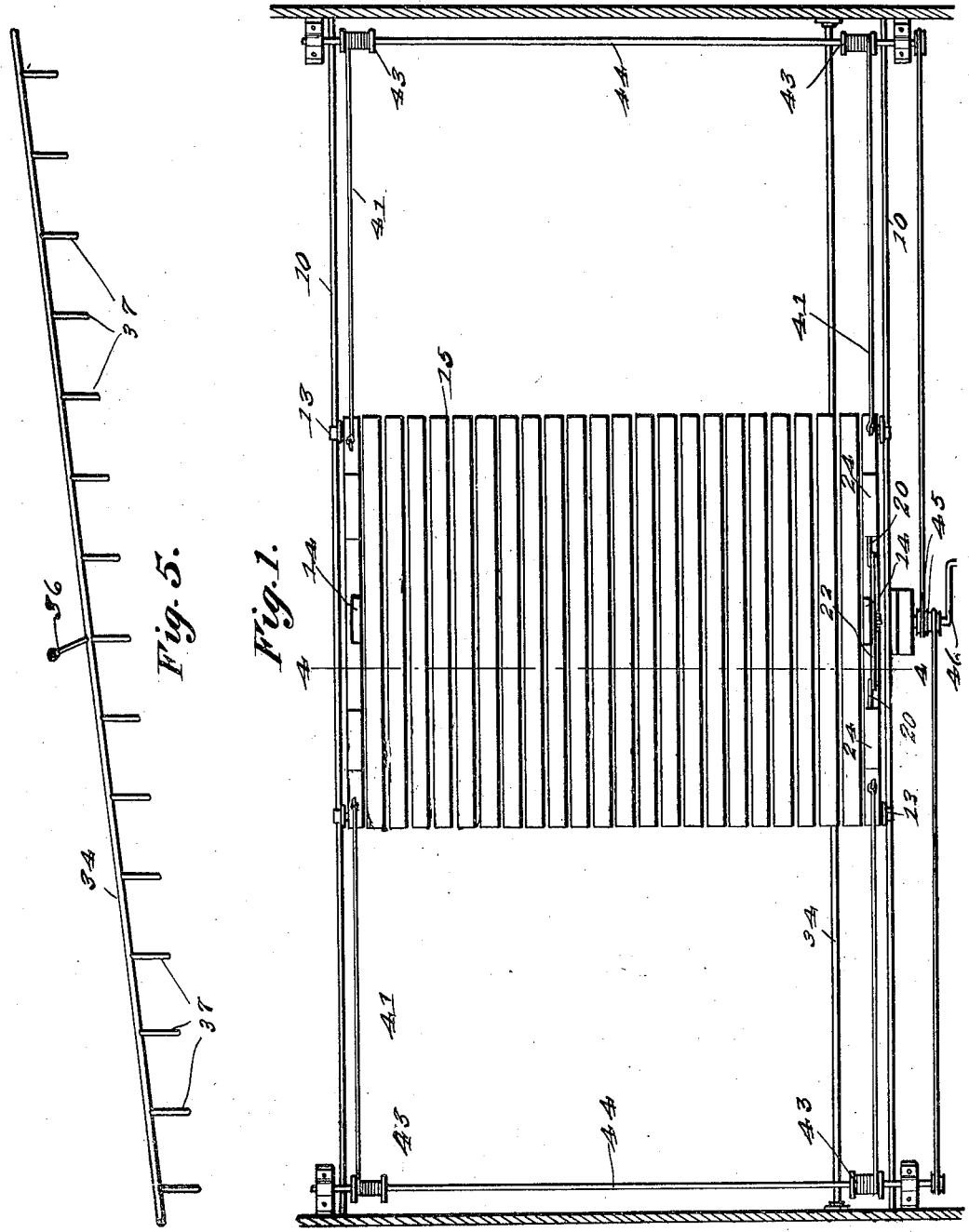

J. G. MAYER.
HAY CARRIAGE.
APPLICATION FILED SEPT. 5, 1919.
1,342,341.
Patented June 1, 1920.
3 SHEETS—SHEET 3.
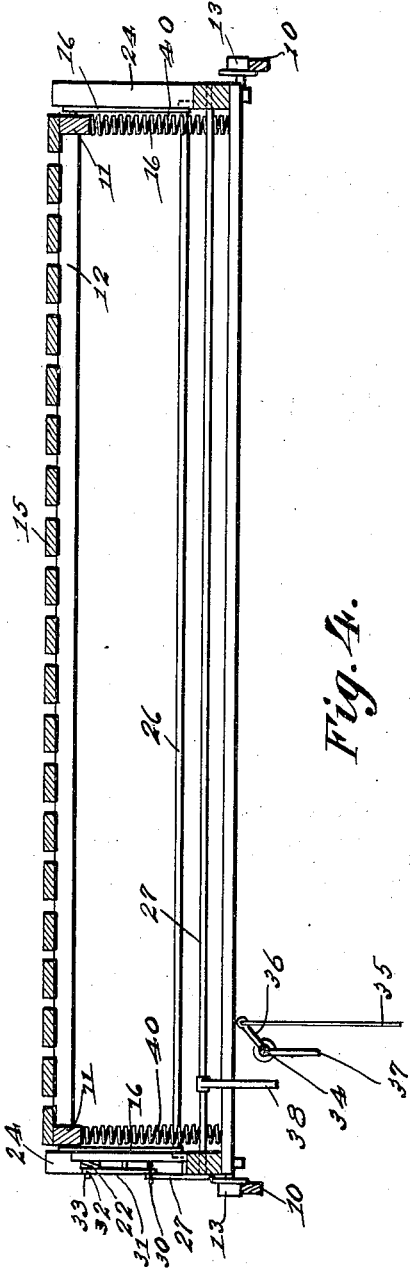
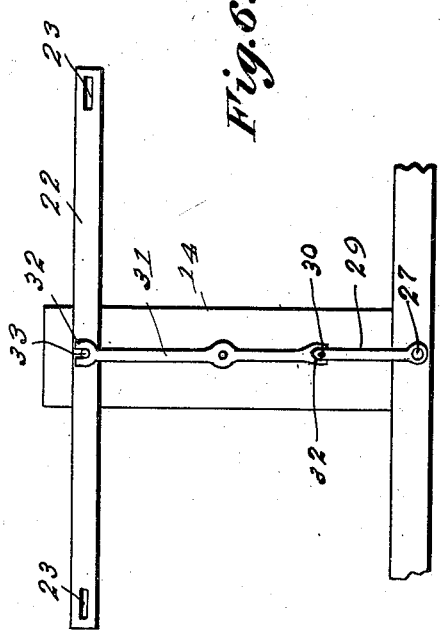
WITNESS:
W. A. Thomas
INVENTOR.
BY John G. Mayer
Victor J. Evans
ATTORNEY.

UNITED STATES PATENT OFFICE.

JOHN G. MAYER, OF MILWAUKEE, WISCONSIN.

HAY-CARRIAGE.

1,342,341.

Specification of Letters Patent.   Patented June 1, 1920.

Application filed September 5, 1919. Serial No. 321,737.

*To all whom it may concern:*

Be it known that I, JOHN G. MAYER, a citizen of the United States, residing at Milwaukee, in the county of Milwaukee and State of Wisconsin, have invented new and useful Improvements in Hay-Carriages, of which the following is a specification.

This invention comprehends the provision of a hay carrier which is mounted upon tracks within a barn, and includes a platform upon which the hay is deposited from the fork, the platform being capable of tilting to either side for the purpose of banking the hay at either side of the barn.

In carrying out the invention, I provide a novel construction of means for tripping the platform at either side and at any interval during its course of travel whereby the hay on the platform can be dumped at any appropriate place along the sides of the barn.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein:

Figure 1 is a plan view.

Fig. 2 is an end elevation showing the normal position of parts.

Fig. 3 is a similar view showing the platform tilted from one side for dumping the hay.

Fig. 4 is a longitudinal sectional view taken on the line 4—4 of Fig. 1.

Fig. 5 is a detail view of the trip bar.

Fig. 6 is an enlarged detail view of part of the trip mechanism.

Referring to the drawings in detail, 10 indicates the rails of the track upon which the hay carriage is mounted for movement. As hereinabove stated, the hay carriage is arranged within a barn for conveying the hay to a point adjacent either side of the barn for banking the same. Consequently, the tracks 10 are disposed transversely of the barn, while the carriage to be hereinafter described is of a length approximately equal to the length of the barn in which it is arranged.

The hay carriage comprises a base frame including spaced side and end members 11 and 12 respectively. Wheels 13 are journaled upon the frame for movement over the rails of the track 10. Rising from the base frame are standards 14 upon which is mounted the mechanism for supporting the pivoted platform 15.

This mechanism, is formed of a pair of spaced arms 16 each of which are pivoted at their lower ends as at 17, upon the carriage base. This construction is clearly illustrated in Figs. 2 and 3, which represents an end elevation of the carriage and it might here be stated that the mechanism is identical at both ends of the machine. A brief description of one end will suffice for both. Each of the arms 16 at a point adjacent its opposite end is provided with a notch 18 adapted to receive a stud or pin 19 projecting from the adjacent end of the platform 15. This construction obviously provides for the pivotal mounting of the platform which can be tilted from either side of the carriage. Each of the arms 16 is connected with one end of a horizontally disposed bolt 20, and the corresponding or adjacent extremities of these bolts are offset as at 21 when connected together through the instrumentality of a bar 22 having slots 23 for the reception of the offset extremities 21 of said bolts. The bolts 20 are slidable through openings in a substantially U-shaped driving element 24 mounted upon the end members of the base frames, and positioned between the standards 14. A coiled spring 25 encircles each bolt, having one end bearing against the adjacent portion of the guide 24, while the opposite end of the spring bears against the adjacent arm 16. The springs 25 function to maintain the arms 16 in a position wherein the studs 19 are received by the notches 18. Manifestly, by the disposition of parts, the platform 15 is held horizontally. A bar 26 is arranged at each side of the carriage and connects the arms 16 in pairs so that the corresponding arms at the opposite end of the carriage are tripped in unison, in a manner to be hereinafter described in order to permit the platform 15 to assume an inclined tilted position to dump the hay therefrom as illustrated in Fig. 3.

The trip mechanism for the carriage embodies a rod 27 disposed beneath the platform 15, and connecting two of the standards 14 at the opposite ends of the carriage. The rod 27 is mounted for rotation within said standard and carried at each end of said rod is a finger 29 from which projects a lug 30. Pivoted upon each end of the standards 14 through which a rod 27 is extended, is a link 31 pivoted at a point between its ends. The opposite ends of this link are bifurcated as at 32, the lower bifurcated extremity receiving the lug 30 from the adjacent finger 29, while the opposite bifurcated extremity of the link receives a pin 33, carried by the connecting bar 22 to the bolts 20. Obviously this mechanism is all mounted upon the carriage for movement therewith over the tracks 10. Positioned beneath each rail of the track, and disposed in parallelism therewith is a shaft 34, journaled for rotation and adapted to be turned within its bearing through the instrumentality of a rope or cable 35. This cable is connected with a crank arm 36 projecting from the shaft 34. The plurality of pins 37 project from each shaft 34 and normally depend from the shaft in vertical position. When it is desired to trip the platform 15, from either side of the carriage, the rope or cable 35 is pulled upon to rotate the shaft 34. The shaft is rotated to change the position of the pins 37 from a vertical position to a horizontal position, in which latter position they are arranged in the path of movement of the adjacent finger 38 depending from the rod 27. As the pins 37 engage the finger 38, the rod 27 is partly rotated and transmitting proper motion to the link 31 to retract one of the bolts 20, at each end of the carriage. Obviously, upon retracting of this pair of bolts, the adjacent arms 16 are moved out of engagement with the platform 15, thus permitting the latter to assume a position such as indicated in Fig. 3 under the weight of its load, thus dumping the hay from the platform along the side of the barn. After the hay has been removed from the platform, the springs 40 which yieldably support the platform, function to automatically return the same to normal or horizontal position and as it assumes its position, the arms 16 which have been retracted will be automatically moved into engagement with the studs 19 through the instrumentality of the springs 25. It is of course to be understood that the hay is deposited upon the platform by means of the usual hay fork (not shown) but which is arranged to move over an elevated track. It should be apparent that by positioning the hay upon the proper part of the platform, initially that the hay can be banked well within the corners of the barn, or along any parts of the sides thereof.

While any suitable means may be utilized for moving the carriage over the track, I preferably make use of cables 41 which are arranged at each side of the track. These cables pass over drums 43 fixed upon the shafts 44. The pulleys 45 are preferably rotated by means of a crank arm or a hook 46 or other suitable means may be employed for this purpose. The cables are arranged to wind upon one set of drums and drawing the machine toward one side of the barn, and to unwind from the other drums. This alternate winding and unwinding of the cables maintain the latter taut at all times.

While I have shown and described what I consider the preferred embodiment of the invention, I desire to have it understood that I do not limit myself in this connection, and that such changes may be resorted to when desired as fall within the scope of what is claimed.

Having thus described my invention what I claim as new is:—

1. A hay carriage comprising a wheeled frame, a platform, pivoted members mounted upon the frame in pairs at the opposite ends of the frame, each of said members having a notch, a stud projecting from the platform and received within said notches and providing a pivotal connection with said platform, means for holding said pivoted members in engagement with said studs whereby the platform is normally held horizontally, and means for tripping said members in pairs, whereby the platform may be tilted from either side of the frame.

2. A hay carriage comprising a wheeled frame, a platform, standards rising from the frame, studs projecting from the platform, pivoted members mounted on said standards and having notches for the reception of said studs, means for holding said members spaced apart and in engagement with the studs whereby the platform is normally held horizontally, means for tripping certain of said members in pairs, whereby the platform may be tilted from either side of the frame, said stud and members providing the pivot for said platform, and yieldable means operating to automatically return the platform and its coöperating parts to normal position.

3. A hay carriage comprising a wheeled frame, a platform, pivoted members movable in pairs adjacent the opposite ends of the frame, each of said members having a notch, a stud projecting from the platform and received within said notches and providing for a pivotal connection with the platform, means for holding said pivoted members in engagement with the studs whereby the platform is normally held horizontally, means for tripping said members in pairs whereby the platform may be tilted from either side of the frame, and means for automatically returning the platform and its coöperating parts from a tilted to a normal position.

In testimony whereof I affix my signature.

JOHN G. MAYER.